US008868430B2

(12) United States Patent
Burvall et al.

(10) Patent No.: US 8,868,430 B2
(45) Date of Patent: Oct. 21, 2014

(54) METHODS, DEVICES, AND COMPUTER PROGRAM PRODUCTS FOR PROVIDING REAL-TIME LANGUAGE TRANSLATION CAPABILITIES BETWEEN COMMUNICATION TERMINALS

(75) Inventors: Henning Burvall, Grödinge (SE); Mikael Salmén, Årsta (SE)

(73) Assignees: Sony Corporation, Tokyo (JP); Sony Mobile Communications Ab, Lund (SE)

( * ) Notice: Subject to any disclaimer, the term of this patent is extended or adjusted under 35 U.S.C. 154(b) by 1450 days.

(21) Appl. No.: 12/355,226

(22) Filed: Jan. 16, 2009

(65) Prior Publication Data

US 2010/0185434 A1    Jul. 22, 2010

(51) Int. Cl.
| | |
|---|---|
| *G10L 21/00* | (2013.01) |
| *G10L 25/00* | (2013.01) |
| *G06F 17/28* | (2006.01) |
| *G10L 15/26* | (2006.01) |
| *G10L 15/00* | (2013.01) |
| *H04M 3/42* | (2006.01) |

(52) U.S. Cl.
CPC ..... *G06F 17/289* (2013.01); *H04M 2203/2061* (2013.01); *G10L 15/265* (2013.01); *G10L 15/005* (2013.01); *H04M 3/42* (2013.01)
USPC ........................................................ 704/277

(58) Field of Classification Search
USPC .......................... 704/2, 277; 379/88.05, 88.06
See application file for complete search history.

(56) References Cited

U.S. PATENT DOCUMENTS

| | | | | |
|---|---|---|---|---|
| 4,882,681 | A | * | 11/1989 | Brotz ................................ 704/3 |
| 5,875,422 | A | * | 2/1999 | Eslambolchi et al. ............ 704/3 |
| 6,161,082 | A | * | 12/2000 | Goldberg et al. ................. 704/3 |
| 6,175,819 | B1 | * | 1/2001 | Van Alstine .................. 704/235 |
| 6,223,150 | B1 | * | 4/2001 | Duan et al. ........................ 704/9 |

(Continued)

FOREIGN PATENT DOCUMENTS

| | | |
|---|---|---|
| WO | WO 2005/048509 A2 | 5/2005 |
| WO | WO 2009/083279 A1 | 7/2009 |

OTHER PUBLICATIONS

"ETSI ES 201 108—Speech Processing, Transmission and Quality Aspects (STQ); Distributed Speech Recognition; Front-end Feature Extraction Algorithm; Compression Algorithms"—V1.1.3; Sep. 2003; pp. 1-22.

(Continued)

*Primary Examiner* — Shaun Roberts
(74) *Attorney, Agent, or Firm* — Myers Bigel Sibley & Sajovec, PA

(57) ABSTRACT

A language translation device includes a network transceiver configured to provide communication between first and second communication terminals, a language recognition unit, and a language translation unit. The language recognition unit is configured to receive a signal representing speech and/or text in a first human language from the first communication terminal and map the received signal to intermediate data. The language translation unit is configured to generate a translated signal representing speech and/or text in a second human language, which is different from the first human language, in response to the intermediate data and provide the translated signal to the second communication terminal. The speech and/or text represented by the translated signal has a meaning corresponding to that of the speech and/or text represented by the received signal. Related devices and methods of operation are also discussed.

21 Claims, 4 Drawing Sheets

(56) References Cited

U.S. PATENT DOCUMENTS

| | | | |
|---|---|---|---|
| 6,266,642 B1* | 7/2001 | Franz et al. | 704/277 |
| 6,385,586 B1 | 5/2002 | Dietz | |
| 6,647,366 B2* | 11/2003 | Wang et al. | 704/201 |
| 7,130,801 B2* | 10/2006 | Kitahara et al. | 704/277 |
| 7,146,321 B2 | 12/2006 | Cyr et al. | |
| 7,689,245 B2* | 3/2010 | Cox et al. | 455/550.1 |
| 8,041,555 B2* | 10/2011 | Buccella | 704/2 |
| 8,060,363 B2* | 11/2011 | Ramo et al. | 704/227 |
| 8,090,588 B2* | 1/2012 | Ojala et al. | 704/500 |
| 8,103,508 B2* | 1/2012 | Lord | 704/270.1 |
| 8,290,779 B2* | 10/2012 | Hoefelmeyer et al. | 704/270.1 |
| 2005/0144012 A1* | 6/2005 | Afrashteh et al. | 704/277 |
| 2008/0133245 A1* | 6/2008 | Proulx et al. | 704/277 |
| 2008/0221862 A1* | 9/2008 | Guo et al. | 704/2 |
| 2010/0121629 A1* | 5/2010 | Cohen | 704/2 |

OTHER PUBLICATIONS

"ETSI ES 202 211—Speech Processing, Transmission and Quality Aspects (STQ); Distributed Speech Recognition; Extended Front-end Feature Extraction Algorithm; Compression Algorithms; Back-end Speech Reconstruction Algorithm"—V1.1.1; Nov. 2003; pp. 1-74.

"ETSI ES 202 050—Speech Processing, Transmission and Quality Aspects (STQ); Distributed Speech Recognition; Advanced Front-end Feature Extraction Algorithm; Compression Algorithms"—V1.1.5; Jan. 2007; pp. 1-45.

"ETSI ES 202 212—Speech Processing, Transmission and Quality Aspects (STQ); Distributed Speech Recognition; Extended Advanced Front-end Feature Extraction Algorithm; Compression Algorithms; Back-end Speech Reconstruction Algorithm"; Nov. 2005; pp. 1-93.

"RTP Payload Format for European Telecommunications Standards Institute (ETSI) European Standard—ES 201 108 Distributed Speech Recognition Encoding", Q. Xie, Ed., Motorola, Inc. (Jul. 2003); pp. 1-14.

International Preliminary Report on Patentability corresponding to International Application No. PCT/IB2009/053106; Date of Mailing: Apr. 6, 2011; 16 pages.

International Search Report and Written Opinion; PCT/IB2009/053106; Jan. 20, 2010.

Communication Pursuant to Article 94(3) EPC corresponding to European Patent Application No. 09 786 630.5-1507; Date of Mailing: Mar. 13, 2013; 6 pages.

* cited by examiner

METHODS, DEVICES, AND COMPUTER PROGRAM PRODUCTS FOR PROVIDING REAL-TIME LANGUAGE TRANSLATION CAPABILITIES BETWEEN COMMUNICATION TERMINALS

FIELD OF THE INVENTION

The present invention relates to communication terminals and, more particularly, to providing user functionality that is distributed across a communication terminal and network infrastructure.

BACKGROUND

Wireless communication terminals are continuing to evolve to provide increasing functionality. Many communication terminals can not only make and receive voice calls, but can further send and receive text messages, picture messages, and video messages. Such communication terminals are used in nearly all countries, providing the capability for worldwide communication, even between users who speak different languages.

Human language translators may not cover all language translation needs in a global society. As such, software has been developed to help meet the needs for communication between people who speak different languages. Software that enables machine translation between different written languages is now available for use on many types of computer devices with increasing quality. Also, current research in speech-to-speech translation technology may lead to quality machine real-time translation in the future. However, accurate translation of spoken languages can require processing resources that may be beyond the capabilities of at least mobile computer devices. Moreover, such processing and memory requirements may increase dramatically with an increase in the number of languages desired for translation.

SUMMARY OF THE INVENTION

According to some embodiments of the present invention, a language translation device includes a network transceiver configured to provide communication between first and second communication terminals, a language recognition unit, and a language translation unit. The language recognition unit is configured to receive a signal representing speech and/or text in a first human language from the first communication terminal and map the received signal to intermediate data. The language translation unit is configured to generate a translated signal representing speech and/or text in a second human language, which is different from the first human language, in response to the intermediate data and provide the translated signal to the second communication terminal. The speech and/or text represented by the translated signal has a meaning corresponding to that of the speech and/or text represented by the received signal.

In some embodiments, the network transceiver may be configured to receive an indication of one of speech and text as a desired output at the second communication terminal. The language translation unit may further include a text output unit configured to generate the translated signal representing text in the second human language in response to the indication of text as the desired output, and a speech synthesizing unit configured to generate the translated signal representing speech in the second human language in response to the indication of speech as the desired output.

In other embodiments, the network transceiver may be configured to receive an indication of a sex and/or age of a user of the first communication terminal, and the speech synthesizing unit may be configured to generate the translated signal representing speech in the second human language in real time using a voice in accordance with the indication of the sex and/or the age of the user of the first communication terminal.

In some embodiments, the network transceiver may be configured to receive, from the first communication terminal, an indication of the first human language among a plurality of available languages as a source language. The language recognition unit may be configured to map the received signal to the intermediate data responsive to the indication of the first human language as the source language. The network transceiver may be configured to receive, from the second communication terminal, an indication of the second human language among the plurality of available languages as a target language. The language translation unit may be configured to generate the translated signal responsive to the indication of the second human language as the target language.

In other embodiments, the language recognition unit may be configured to select the first human language among a plurality of available languages as a default source language for mapping the received signal according to a first geographic location associated with the first communication terminal. The language translation unit may be configured to select the second human language among the plurality of available languages as a default target language for generating the translated signal according to a second geographic location associated with the second communication terminal.

In some embodiments, the device may include a controller configured to determine the first and/or second geographic locations according to a respective country code, positioning signal, and/or geographic location of network infrastructure associated with the first and/or second communication terminals.

In other embodiments, the network transceiver may be configured to receive a translation service request including an identification of the second communication terminal from the first communication terminal, transmit an invitation to the second communication terminal responsive to receiving the translation service request, receive an acceptance from the second communication terminal in response to the invitation, and establish the communication between the first and second communication terminals in response to receiving the acceptance.

In some embodiments, the network transceiver may be configured to provide communication with a third communication terminal. The language translation unit may be configured to generate a second translated signal representing speech and/or text in a third human language, which is different from the first and second human languages, in response to the intermediate data and provide the translated signal to the third communication terminal. The speech and/or text represented by the second translated signal has a meaning corresponding to that of the speech and/or text represented by the received signal.

In other embodiments, the language recognition unit may be configured to provide an indication of a preferred sampling rate, coding rate, speech coding algorithm, and/or parametric model to the first communication terminal for conversion of speech in the first human language into the speech signal. The preferred sampling rate, coding rate, speech coding algorithm, and/or parametric model may be different than that used by the first communication terminal when operating in a non-language translation mode. The language recognition unit may be configured to receive the signal representing speech and/or text in the first human language from the first communication terminal in response to providing the indication.

According to other embodiments of the present invention, a method of providing language translation between first and second communication terminals includes establishing communication between the first and second communication terminals. A signal representing speech and/or text in a first human language is received from the first communication terminal. The received signal is mapped to intermediate data in a language recognition unit. A translated signal representing speech and/or text in a second human language, which is different from the first human language, is generated in response to the intermediate data in a language translation unit and provided to the second communication terminal. The speech and/or text represented by the translated signal has a meaning corresponding to that of the speech and/or text represented by the received signal.

In some embodiments, an indication of one of speech and text may be received as a desired output at the second communication terminal. The translated signal may be generated in the language translation unit to represent one of speech and text in the second human language responsive to the indication of the desired output.

In other embodiments, where the indication of the desired output is speech, an indication of a sex and/or an age of a user of the first communication terminal may be received from the first communication terminal. The translated signal may be generated in real time to represent speech in the second human language using a voice in accordance with the indication of the sex and/or the age of the user of the first communication terminal.

In some embodiments, an indication of the first human language as a source language may be received from the first communication terminal, and the received signal may be mapped to the intermediate data in the language recognition unit responsive to the indication of the first human language as the source language. Also, an indication of the second human language as a target language may be received from the second communication terminal, and the translated signal may be generated in the language translation unit responsive to the indication of the second human language as the target language.

In other embodiments, the first human language may be selected among a plurality of available languages as a default source language for mapping the received signal to the intermediate data in the language recognition unit according to a first geographic location associated with the first communication terminal. The second human language may be selected among the plurality of available languages as a default target language for generating the translated signal in the language translation unit according to a second geographic location associated with the second communication terminal. The first and/or second geographic locations may be determined according to a respective country code, positioning signal, and/or geographic location of network infrastructure associated with the first and/or second communication terminals.

In some embodiments, to establish the communication between the first and second communication terminals a translation service request including an identification of the second communication terminal may be received from the first communication terminal. An invitation may be transmitted to the second communication terminal responsive to the translation service request. An acceptance may be received from the second communication terminal in response to the invitation, and the communication between the first and second communication terminals may be established in response to the acceptance.

In other embodiments, an indication of a preferred sampling rate, coding rate, speech coding algorithm, and/or parametric model may be provided to the first communication terminal for conversion of speech in the first human language into the speech signal. The preferred sampling rate, coding rate, speech coding algorithm, and/or parametric model may be different than that used by the first communication terminal when operating in a non-language translation mode. The signal representing speech and/or text in the first human language may be received from the first communication terminal in response to the indication.

Other electronic devices, methods, and/or computer program products according to embodiments of the invention will be or become apparent to one with skill in the art upon review of the following drawings and detailed description. It is intended that all such additional electronic devices, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1:
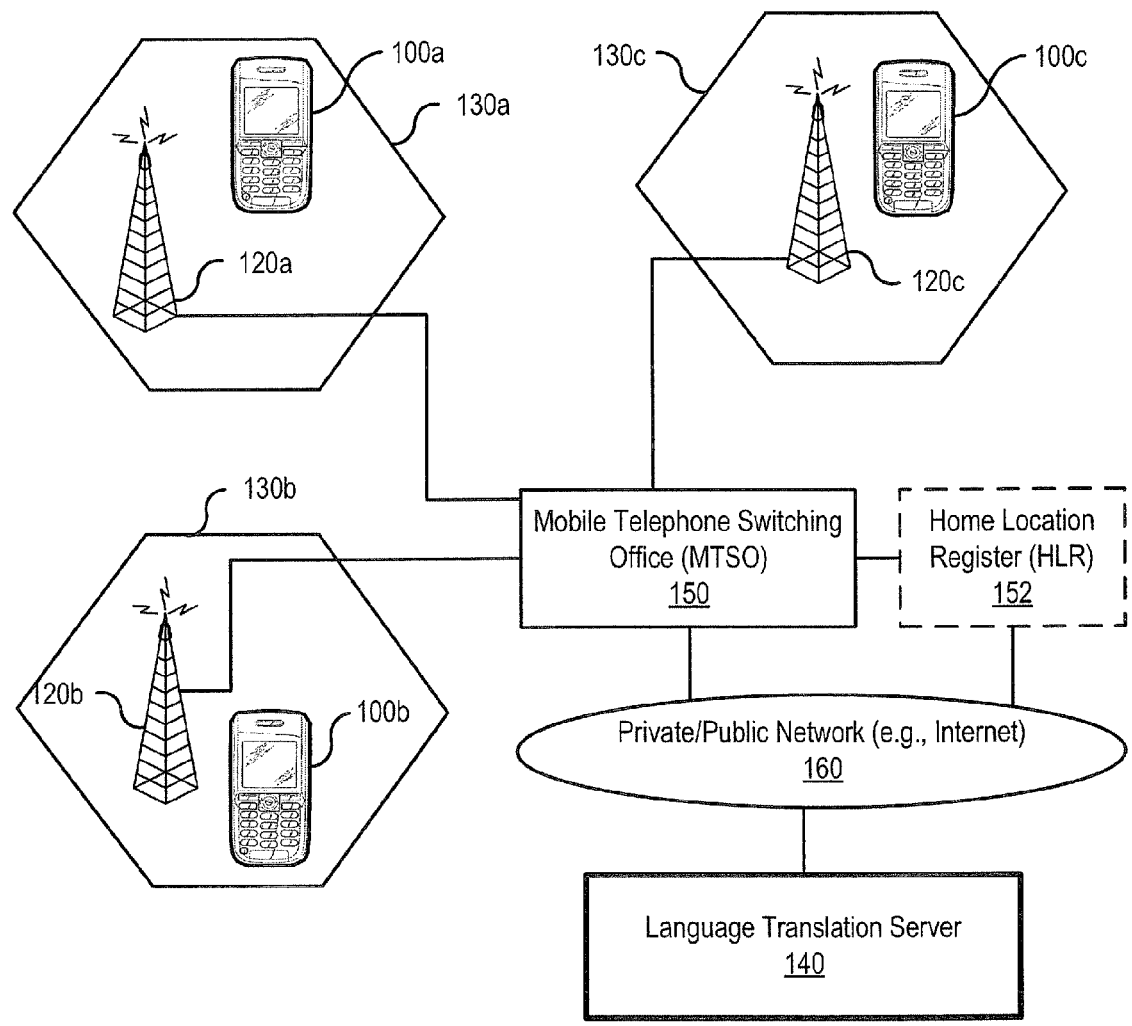
FIG. 1 is a schematic block diagram of a communication system that includes exemplary communication terminals and an exemplary language translation server which are configured to operate cooperatively in accordance with some embodiments of the present invention.

The present invention now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by hardware and/or in software (including firmware, resident software, micro-code, etc.), referred to herein as "circuitry" or "circuit". For example, some of the functionality my be implemented in computer program instructions that may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

A computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Although some of the diagrams include arrows on communication paths to show a primary direction of communication, it is to be understood that communication may occur in the opposite direction to the depicted arrows.

For purposes of illustration and explanation only, various embodiments of the present invention are described herein in the context of wireless mobile communication terminals ("wireless terminals"). It will be understood, however, that the present invention is not limited to such embodiments and may be embodied generally in any system where communication is provided between two or more communication terminals, where at least one of the users of the communication terminals speaks a different natural human language than another of the users of the communication terminals. As used herein, a "human language" refers to a language that is spoken or written in phonemic-alphabetic or phonemically-related iconographic form by humans for general-purpose communication, and does not include computer-programming or other machine-readable languages.

Various embodiments of the present invention provide an automatic language translation control mechanism to enable a networked translation service that provides real-time spoken language translation in point-to-point, point-to-multipoint, and/or broadcast communication. The control mechanism involves clients in both the initiating wireless terminal (also referred to herein as the "calling party") and the terminating wireless terminal(s) (also referred to herein as the "called party"), as well as a network-based language server control and the communication procedure between these entities. The control mechanism may combine distributed speech recognition, text-to-speech, and machine language translation, and may automatically negotiate capabilities between clients and servers to provide real-time language translation in a network. In particular, the control mechanism may provide an automatic capability negotiation between a client in the calling party's phone, a network based language translation server, and a client in the destination party's phone. The language translation mechanism can be used in peer-to-peer personal communication, person-to-many communication, and/or person-to-customer relation management systems. Multi-modal communication (in the form of peer-to-peer text-to-speech and/or speech-to-text) may also be included in the control mechanism according to embodiments of the present invention.

FIG. 1 is a schematic block diagram of a communication system that includes exemplary wireless communication terminals 100a-100c and an exemplary language translation server 140 which are configured to operate in accordance with some embodiments of the present invention. Referring to FIG. 1, the wireless communication terminals 100a-100c can communicate with the language translation server 140 through various wireless and wireline communication infrastructure, which can include a mobile telephone switching office (MTSO) 150 and a private/public network (e.g., Internet) 160. As shown in FIG. 1, the wireless terminals 100a-100c can communicate with a plurality of base stations 120a-120c, each of which provides communications within their respective cells 130a-130c. Registration information for subscribers of the wireless terminals 100a-100c may be contained in a home location register (HLR) 152.

The users of the wireless terminals 100a-100c may each speak a different human language. For example, the user of the wireless terminal 100a may only know how to read and/or speak in the English language, while the user of the wireless terminal 100b may only know how to read and/or speak in the French language. Accordingly, when a user of the wireless terminal 100a wishes to communicate with a user of the communication terminal 100b, the user of the wireless terminal 100a may enter a command to establish a communication session with the user of the wireless terminal 100b via the language translation server 140. In response to receiving the user command, the wireless terminal 100a contacts the language translation server 140 with a translation service request for communication with the wireless terminal 100b. The user of the communication terminal 100b thereby receives an invitation from the language translation server 140 indicating that communication has been requested by the user of the wireless terminal 100a, and that translation may be required. The user of the communication terminal 100b accepts the communication invitation, and the communication terminal 100b transmits an acceptance to the language translation server 140. Accordingly, the language translation server 140 establishes a communication session to provide two-way speech translation (e.g. English-to-French and French-to-English). However, if the user of the wireless terminal 100b indicates that he prefers the native language spoken by the user of the communication terminal 100a, the communication session with the language translation server 140 may be terminated.

Figure 2:
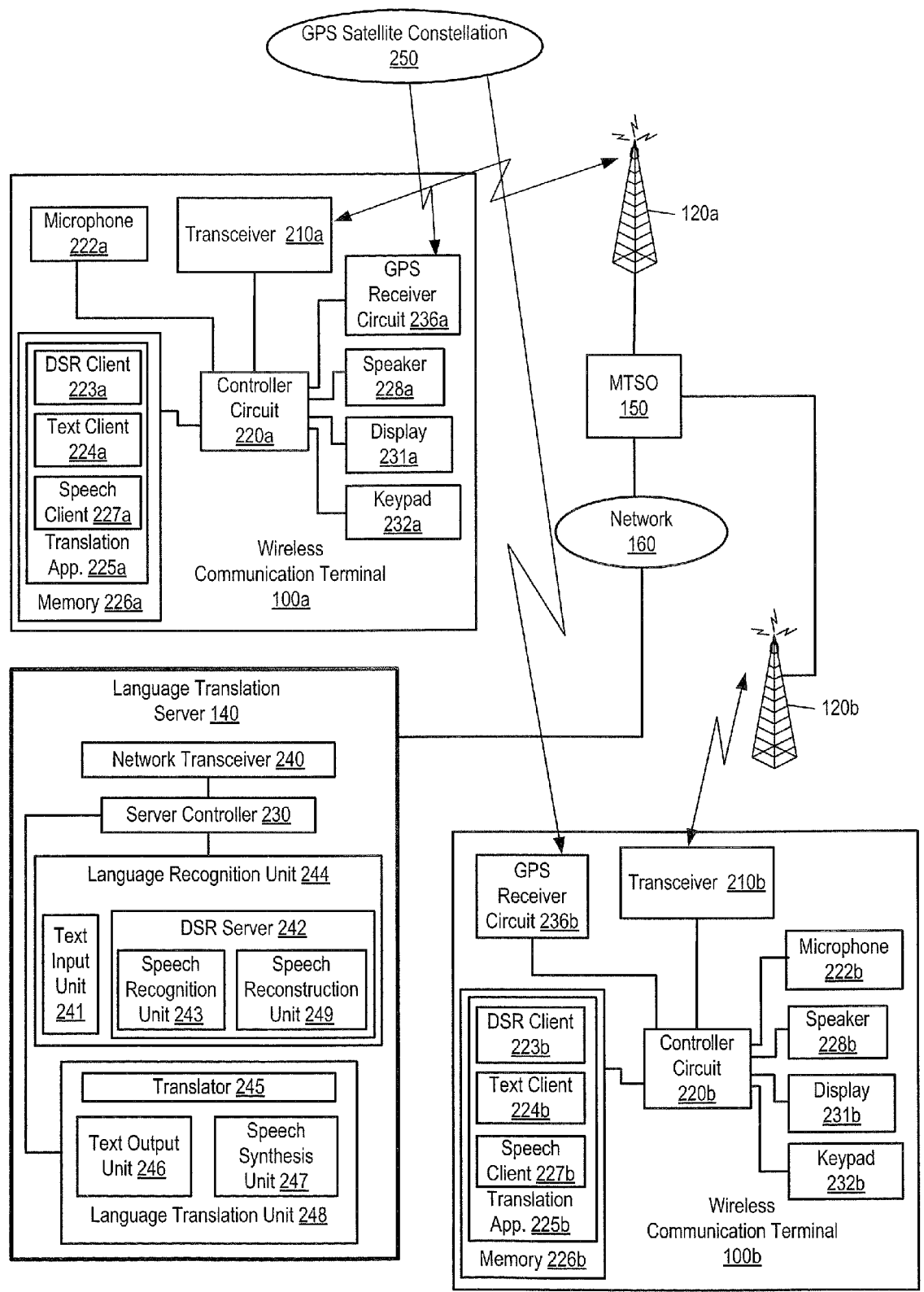
FIG. 2 is a schematic block diagram illustrating further aspects of the communication terminals and language translation server shown in FIG. 1 in accordance with some embodiments of the present invention.

FIG. 2 is a schematic block diagram illustrating further aspects of the wireless terminals 100a and 100b and the language translation server 140 shown in FIG. 1 in accordance with some embodiments of the present invention. As shown in FIG. 2, the wireless terminals 100a and 100b may include respective controller circuits 220a and 220b, microphones 222a and 222b, speakers 228a and 228b, displays 231a and 231b, keypads 232a and 232b, memory units 226a and 226b, wireless transceivers 210a and 210b, and GPS receiver circuits 236a and 236b. The GPS receiver circuits 236a and 236b can determine the positions of the wireless terminals 100a and 100b, respectively, in response to signals received from a GPS satellite constellation 250. The transceivers 210a and/or 210b may respectively include a cellular transceiver configured to encode/decode and control communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The transceivers 210a and/or 210b may also respectively include a WLAN (e.g., IEEE 802.11b-g) and/or Bluetooth transceiver. As such, the wireless terminals 100a and/or 100b may communicate with the language translation server 140 via the base stations 120a-120b and/or via proximately located WLAN router/Bluetooth devices (not shown) connected to the network 160.

The memory units 226a and 226b may store respective real-time language translation applications 225a and 225b, which are configured to communicate with the language translation server 140 to provide voice and/or text translation. In particular, the real-time language translation applications 225a and 225b include respective Distributed Speech Recognition (DSR) client applications 223a and 223b, text client applications 224a and 224b, and speech client applications 227a and 227b. The DSR client applications 223a and 223b are configured to provide respective speech signals to a DSR server application 242 in the language translation server 140. The DSR client applications 223a and 223b and the DSR server application 242 provide a distributed system for converting signals representing spoken words into machine-readable inputs, as discussed in detail below. The text client applications 224a and 224b are configured to provide a signal representing text to a text input unit 241 and/or receive a translated signal representing text from a text output unit 246 of the language translation server 140. The speech client applications 227a and 227b are configured to receive a translated speech signal from a speech synthesis unit 247 of the language translation server 140.

The controller circuits 220a and 220b may be configured to operate differently when executing the respective real-time language translation applications 225a and 225b than when operating in at least one non-language translation mode. For example, when operating in the language translation mode, a user can speak in a first human language into the microphone 222a, and the speech may be encoded by a voice encoder/decoder (vocoder) included in the controller 220a using a different sampling rate, coding rate, and/or coding algorithm than typically used for voice communication. The controller circuit 220a may, for example, control the vocoder to select among speech coding out algorithms that can include, but are not limited to, one or more different bit rate adaptive multi-rate (AMR) algorithms, full rate (FR) algorithms, enhanced full rate (EFR) algorithms, half rate (HR) algorithms, code excited linear prediction (CELP) algorithms, selectable mode vocoder (SMV) algorithms. In one particular example, the controller circuit 220a may select a higher code rate, such as 12.2 kbit/sec, for an AMR algorithm when executing the real-time language translation application 225a, and select a lower code rate, such as 6.7 kbit/sec, for the AMR algorithm when operating in a non-language translation mode. Accordingly, when executing the respective real-time language translation applications 225a and 225b, the controller circuits 220a and 220b can select a higher sampling rate, higher coding rate, and/or a speech coding algorithm that provides better quality speech coding in the speech signal than what is selected in use when operating in a non-language translation mode, and may provide this information to the language translation server 140. Consequently, the speech signal can contain higher fidelity reproduction of the speech sensed by the microphone 222a when the wireless terminal 100a is executing the real-time language translation application 225a so that the language translation server 140 may more accurately carry-out recognition (e.g., within the speech recognition unit 243) and/or translation (e.g., within the language translation unit 248) of received speech into the target language for transmission to the wireless terminal 100b.

Additionally or alternatively, when operating in the language translation mode, a user can speak in a first human language into the microphone 222a, and the controller 220a may include a DSR codec configured to employ a parametric model (for example, as specified by the DSR client application 223a) to extract important or vital information (also referred to as "features") contained in the speech for the DSR server application 242 in the language translation server 140. Thus, as described herein, the "speech signal" may refer to any modeled signal which represents the contents of the speech. Such a speech signal may be more error resilient (for example, less sensitive to radio bearer introduced problems) than a conventional vocoded signal. The extracted features may be compressed before transmission to the speech recognition unit 243 of the language translation server 140. Accordingly, when the wireless terminal 100a is executing the real-time language translation application 225a, the controller 220a may be configured to perform feature extraction and feature compression of the speech provided via the microphone 222a to generate a speech signal that may be tailored and/or optimized for the speech recognition unit 243, e.g., to convey the information that may be important or vital for the speech recognition unit 243 to perform efficiently and robustly.

The controller circuits 220a and/or 220b can also determine which of a plurality of spoken languages is used in the speech signals received via their respective microphones 222a and 222b in response to the selected language setting for the respective displays 230a and 230b. Thus, for example, when a user of the wireless terminal 100b has defined French as a language in which textual menus are to be displayed on the display 231b, the controller circuit 220b can determine that any speech that is received through the microphone 222b, while that setting is established, is being spoken in French, and can provide data indicating this to the language translation server 140. Accordingly, the speech recognition unit 243 can select one of a plurality of spoken languages as the original language in response to the user's display language setting. The controller circuits 220a and 220b can also generate data so as to indicate a present geographic location of the wireless terminal. For example, the controller circuit 220b can determine its geographic location, such as geographic coordinates, through the GPS receiver circuit 236b which uses GPS signals from a plurality of satellites in a GPS satellite constellation 250 and/or assistance from the cellular system (e.g., cellular system assisted positioning). This geographic location information can be used by the language translation server 140, along with knowledge of a primary language that is spoken in the associate geographic region, to automatically select that primary language as the target language for translation.

Still referring to FIG. 2, the language translation server 140 includes a network transceiver 240, a language recognition unit 244, and a language translation unit 248. The network transceiver 240 is configured to communicate with the wireless terminals 100a and 100b via the wireless and wireline infrastructure. The language recognition unit 244 includes a text input unit 241 and a DSR server application 242, which includes a speech recognition unit 243 and a speech reconstruction unit 249. The language recognition unit 244 receives the signal representing speech and/or text in a first human language from the wireless terminal 100a, and is configured to map received signals to intermediate data, such as machine-readable data, for a plurality of available human languages. In particular, the text input unit 241 maps signals representing text to intermediate data, while the DSR server application 242 maps signals representing speech to intermediate data.

The language recognition unit 244 may require a priori knowledge of the human language that corresponds to the signal received from the wireless terminal 100a in order to accurately perform the mapping to the intermediate data. As such, in some embodiments, the wireless terminal 100a may also transmit data (such as metadata) to the language translation server 140 indicating that the user of the wireless terminal 100a speaks English, and the language translation server controller 230 may thereby select English as the source language for mapping the received signal. In addition or alternatively, the language translation server controller 230 may select English as the source language for mapping the received signal according to a geographic location of the wireless terminal 100a, for example, as determined from a country code and/or GPS coordinates associated with and/or provided by the wireless terminal 100a. The language translation server 140 may alternatively or additionally receive data from the wireless and/or wireline infrastructure that indicates a geographic location of cellular network infrastructure that is communicating with the wireless terminal 100a, such as metadata that identifies a base station identifier and/or routing information that is associated with known geographic location/regions, thereby indicating a primary language that is spoken at the present geographic region of the wireless terminal 100a. The language translation server 140 may alternatively or additionally receive data that identifies a home geographic location of a wireless terminal 100a, such as by querying the HLR 152, and can use the identified location to identify the original language spoken by the user. Therefore, the language translation server controller 230 can select English, among a plurality of available languages, as the original language spoken by the user of the wireless terminal 100a when the user is registered with a cellular operator in the U.S.

The language recognition unit 244 carries out speech recognition based on both syntax and semantics to map the received speech signal to intermediate data, such as machine-readable data. More particularly, in the above example, when a speech signal in the English language is received at the language translation server 140, the speech recognition unit 243 maps the received speech signal to machine-readable intermediate data indicative of sounds and/or words in the English language. However, the speech recognition unit 243 may require a relatively high-quality speech signal to accurately carry out recognition, for example, as compared to that generated by the wireless terminal 100a when operating in a non-language translation mode. As noted above, the controller 220a of the wireless terminal 100a may increase a coding rate, a sampling rate, and/or use a different coding algorithm and/or parametric model when generating a speech signal that is to be provided to the language translation server 140 (e.g., when the real-time language translation application 225a is in use). In addition and/or alternatively, the language translation server 140 may transmit a request to the wireless terminal 100a indicating a preferred sampling rate, coding rate, coding algorithm, and/or parametric model, for example, if current parameters are insufficient for accurate mapping of the received speech signal by the speech recognition unit 243. In response, the controller 220a of the wireless terminal 100a may adjust the parameters used to generate the speech signal in accordance with a request from the language translation server 140. Also, the speech reconstruction unit 249 provided in the DSR server application 242 may be configured to transform the received speech signal (for example, into the frequency domain) to improve the accuracy of the speech recognition unit 243. Thus, the language translation server 140 may select, request, and/or adapt speech recognition parameters/algorithms so as to more accurately carry-out recognition of the received speech signal at the speech recognition unit 243.

The language recognition unit 244 provides the intermediate data to the language translation unit 248, which generates a translated signal in a second human language, which is different from the first human language, based on the intermediate data generated by the language recognition unit 244. In particular, in the above example, the translator 245 of the language translation unit 248 translates the machine-readable intermediate data received from the speech recognition unit 243 into further data indicative of sounds/words in the French language, and the speech synthesis unit 247 synthesizes sounds in the French language corresponding to the further data to generate the translated speech signal in real-time. In some embodiments, the speech synthesis unit 247 may generate the translated signal using a voice in accordance with a received indication of the age, sex, and/or other vocal characteristics of the user of the wireless terminal 100a. For example, the real-time translation application 225a executing on the wireless terminal 100a may prompt the user for the information regarding his/her age and/or sex, and may transmit the received information to the language translation server 140. Thus, the speech synthesis unit 247 may generate a speech signal having characteristics corresponding to the vocal characteristics of the user of the wireless terminal 100a.

The language translation unit 248 may also require knowledge of a desired or target language (among a plurality of available languages) in order to generate the translated signal. In some embodiments, the wireless terminal 100b may transmit data to the language translation server 140 indicating that the user of the wireless terminal 100b speaks French, and the language translation server controller 230 may thereby select French as the target language for generating the translated signal. In addition or alternatively, the language translation server controller 230 may select French as the target language for generating the translated signal according to data indicating a geographic location of the wireless terminal 100b, for example, as determined from a country code, GPS coordinates, and/or geographic location of network infrastructure associated with and/or provided by the wireless terminal 100b. The language translation server 140 may alternatively or additionally receive data that identifies a home geographic location of the wireless terminal 100b, such as by querying the HLR 152, and can use the identified location to identify the language spoken by the user of a wireless terminal 100b.

The language translation server 140 transmits the translated signal representing speech and/or text in the second human language through the network transceiver 240 and the wireless and wireline infrastructure to the wireless terminal 100b. The translated speech signal is received by the wireless terminal 100b via the transceiver 210b, and played by the speech client application 227b through the speaker 228b. The speech and/or text represented by the translated signal has a meaning corresponding to the meaning of the speech and/or text represented by the signal received from the wireless terminal 100a. Thus, with reference to the above example, the wireless terminal 100b outputs the translated speech signal in the French language via the speaker 228b, so that it may be understood by the user of the wireless terminal 100b.

The language translation server 140 may also be configured to provide the translated signal to the wireless terminal 100b in accordance with a desired mode of output (e.g. text or speech) at the wireless terminal 100b. For example, the user of the wireless terminal 100b may provide an indication to the language translation server 140 that text is the preferred mode of output at the wireless terminal 100b. Thus, responsive to receiving the data indicative of sounds/words in the French language from the translator 245 in the above example, the text output unit 246 may generate a translated signal representing text in the French language, and the language translation server may transmit the translated text signal to the wireless terminal 100b for rendering by the text client application 224b on the display 231b. Accordingly, embodiments of the present invention may provide text-to-text, speech-to-speech, speech-to-text, and/or text-to speech translation in real-time.

Although the block diagrams of FIGS. 1 and 2 illustrate the wireless terminals 100a-100c, the language translation server 140, and the wireless and wireline infrastructure with various separately defined elements for ease of illustration and discussion, it will be understood that the present invention is not limited to such a configuration but is intended to encompass any configuration capable of carrying out the operations described herein. For example, some or all of the functionality of the language translation server 140 may be included in the communication terminals 100a and/or 100b in some embodiments. More generally, various functionality described herein in separate functional elements may be combined within a single functional element and, vice versa, functionally described herein in single functional elements can be carried out by a plurality of separate functional elements. Also, although discussed above with reference to speech translation between two human languages, it will be understood that embodiments of the present invention may translate a received signal representing speech and/or text in one language into speech and/or text in two or more different human languages.

Figure 3:
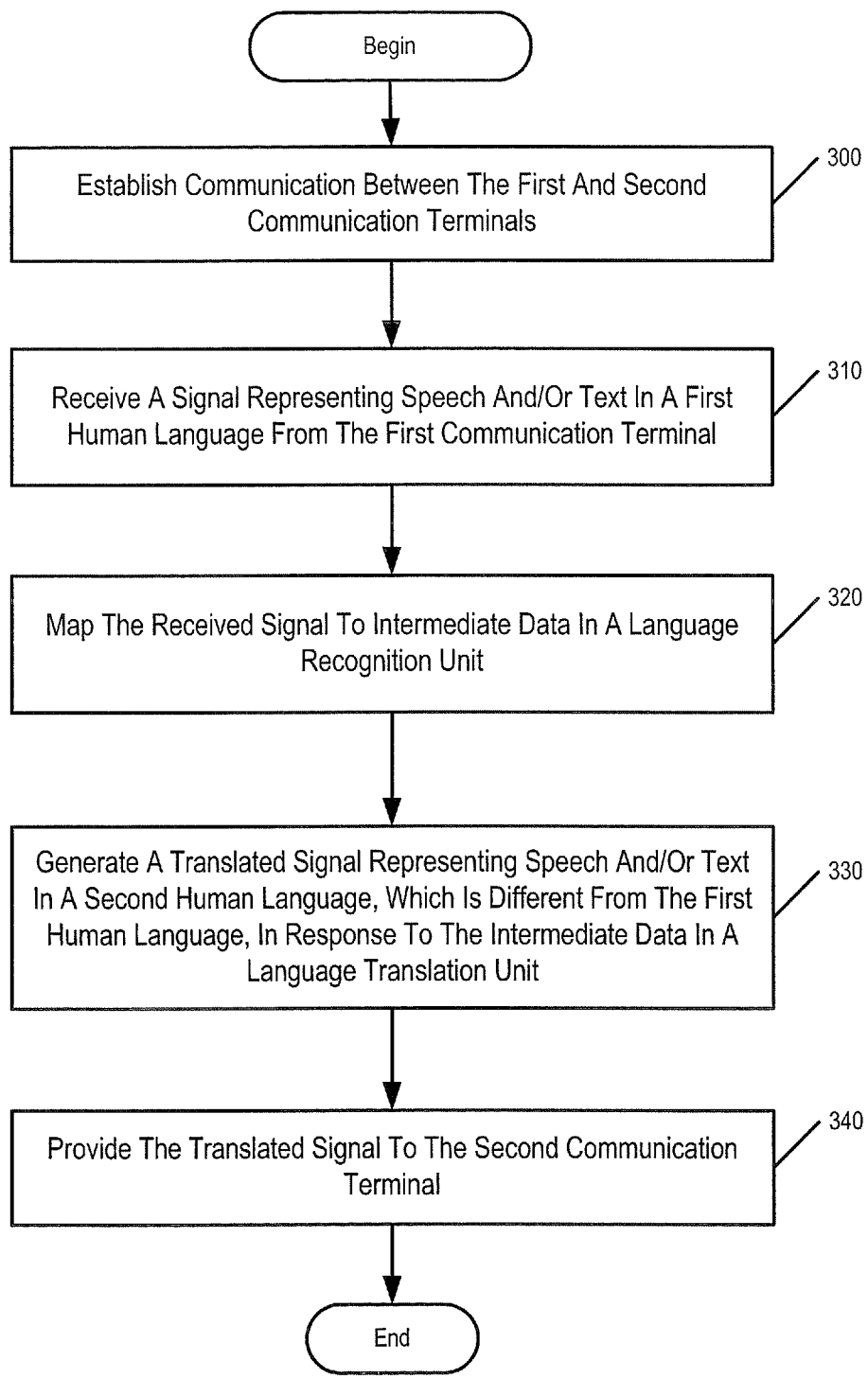
FIG. 3 is a flowchart illustrating example operations for providing language translation services between communication terminals in real-time in accordance with some embodiments of the present invention.

FIG. 3 is a flowchart illustrating operations for providing language translation services between the first and second communication terminals 100a and 100b in real-time in accordance with some embodiments of the present invention. Referring now to FIG. 3, operations begin at Block 300 where communication is established between the first communication terminal 100a and a second communication terminal 100b. For example, the language translation server 140 may receive a translation service request that identifies the second communication terminal 100b from the first communication terminal 100a, and the language translation server 140 may transmit an invitation to the second communication terminal 100b responsive to the translation service request. The language translation server 140 may receive an acceptance from the second communication terminal 100b in response to the invitation, and may establish the communication between the first and second communication terminals 100a and 100b in response to the acceptance.

At Block 310, a signal representing speech and/or text in a first human language is received from the first communication terminal 100a. For example, the user of the first communication terminal 100a may be an American; thus, the signal may represent speech and/or text in the English language. The received signal is mapped to intermediate data, such as machine-readable data, at Block 320. For example, where the received signal represents speech, the speech recognition unit 243 of the language recognition unit 244 may map the received speech signal to intermediate data indicative of English sounds and/or words. The language translation server controller 230 may select English as the source language for mapping the received signal according to an indication provided by the first communication terminal 100a and/or a geographic location of the first communication terminal 100a, for example, as determined from a country code, GPS signal, and/or geographic location of network infrastructure associated with the first communication terminal 100a.

At Block 330, a translated signal is generated based on the intermediate data. The translated signal may represent speech and/or text in a second human language, which is different from the first human language. For example, the user of the second communication terminal 100b may be French; thus, the translated signal may represent speech and/or text in the French language. In particular, the translator 245 of the language translation unit 248 may translate the intermediate data into data indicative of words in the French language, and the speech synthesis unit 247 of the language translation unit 248 may synthesize sounds in the French language corresponding to the indicated words to generate the translated signal. The language translation server controller 230 may select French as the target language for generating the translated signal according to an indication provided by the second communication terminal 100b and/or a geographic location of the second communication terminal 100b, for example, as determined from a country code, GPS signal, and/or geographic location of network infrastructure associated with the second communication terminal 100b. In some embodiments, the speech synthesis unit 247 may synthesize the sounds using a voice in accordance with an indication of the sex and/or age of a user of the first communication terminal 100a. At Block 340, the translated signal is provided to the second communication terminal 100b. For example, the language translation server 140 may transmit the translated signal to the communication terminal 100b via the network transceiver 240. Accordingly, a user can speak a first language into the first communication terminal 100a and, through a voice communication link to the language translation server 140, have the spoken words electronically translated by the language translation server 140 into a different target language, which is audibly broadcast from the second communication terminal 100b for listening by a user thereof who speaks a different language.

Figure 4:
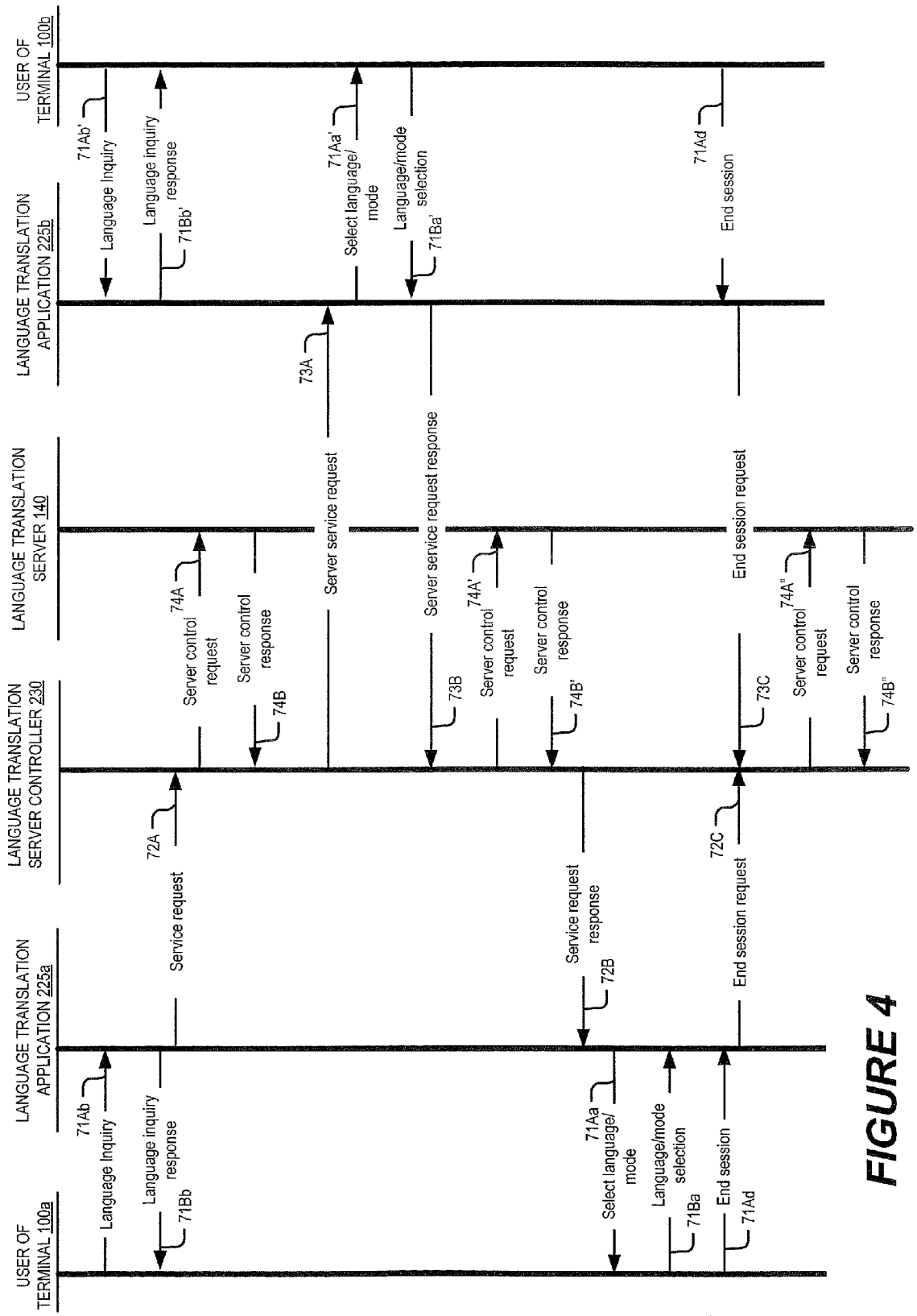
FIG. 4 is a flow diagram illustrating an example control sequence for providing language translation services between communication terminals in real-time in accordance with some embodiments of the present invention.

FIG. 4 is a flow diagram illustrating an example control sequence for providing real-time language translation between the first and second communication terminals 100a and 100b executing language translation applications 225a and 225b, respectively, in accordance with some embodiments of the present invention. Referring now to FIG. 4, in initial preparation for communication with the language translation server 140, the language translation application 225a executing on a wireless terminal 100a provides a language inquiry (dataflow 71Ab) to a user of the wireless terminal 100a, for example, via the display 231a and/or other user interface. The language inquiry (dataflow 71Ab) may request the user's desired or preferred language for transmitting and/or receiving speech and/or text signals to/from the language translation server 140. The language translation application 225a thereby receives a language inquiry response (dataflow 71Bb) from the user indicating the user's desired or preferred language. The language translation application 225b executing on the wireless terminal 100b similarly provides a language inquiry (dataflow 71Ab') to a user of the wireless terminal 100b, and likewise receives a language inquiry response (dataflow 71Bb') from the user.

Still referring to FIG. 4, to establish a session with the language translation server 140, the language translation application 225a transmits a service request (dataflow 72A to the language translation server controller 230. The server controller 230 forwards a server control request (dataflow 74A) to the language translation server 140, and receives a server control response (dataflow 74B) therefrom. The server controller 230 thereby transmits a server service request (dataflow 73A) to the language translation application 225b executing on the wireless terminal 100b as an invitation to communicate with the wireless terminal 100a. In response to the server service request (dataflow 73A), a language translation application 225b provides a language and/or mode selection inquiry (dataflow 71Aa') to the user of the wireless terminal 100b requesting the user's desired language for communication with the wireless terminal 100a, and/or preferred mode of output (e.g., text or speech) at the wireless terminal 100b. The language translation application 225b thereby receives a language and/or mode selection response (dataflow 71Ba') indicating the users desired language and/or mode of output, and transmits a server service request response (dataflow 73B) back to the server controller 230 to accept the invitation. The server controller 230 forwards a server control request (dataflow 74A') indicating the acceptance, desired language, and/or mode of output for the wireless terminal 100b to the language translation server 140, and receives a server control response (dataflow 74B) therefrom indicating receipt. The server controller 230 thereby transmits a server service request response (dataflow 72B) to the language translation application 225a (in response to the initiating server service request (dataflow 72A)) to establish the session with the language translation server 140. The language translation application 225a presents a language and/or mode selection inquiry (dataflow 71Aa) to the user of the wireless terminal 100a, and receives a language and/or mode selection response (dataflow 71Ba) therefrom, which indicates the user's desired language and/or preferred mode of output at the wireless terminal 100a. Accordingly, the user of the wireless terminal 100a provides speech and/or text in a first language (such as English), which is represented in a signal forwarded to the language translation server 140, translated into a signal representing speech and/or text in a second language (such as French), and transmitted to the wireless terminal 100b for output as speech and/or text in the second language, as discussed above.

To end a communication session with the language translation server 140, the user of the wireless terminal 100a may provide an end session indication (dataflow 71Ad) to the language translation application 225a via the user interface of the wireless terminal 100a. Additionally or alternatively, the user of the wireless terminal 100b may similarly provide an end session indication (dataflow 71Ad') to the language translation application 225b via the user interface of the wireless terminal 100b. In response, the language translation applications 225a and/or 225b may transmit end session requests (dataflow 72C) and (dataflow 73C), respectively, to the server controller 230. The server controller 230 may thereby transmit a server control request (dataflow 74A") to the language translation server 140 indicating the desired to end the session, and may receive a server control response (dataflow 74B") therefrom, ending the session.

Particular mechanisms for real-time spoken language translation in point to point, point to multipoint and broadcast communication in accordance with some embodiments of the present invention may be based on the communication procedures described below. These communication procedures with its information elements provide the establishment and control of the translation solution. This document describes the capabilities in the phones and the communication protocols needed to control and to provide the X-Language Translation mechanism in accordance with some embodiments of the present invention. The standardized Distributed Speech Recognition (DSR) mechanism is used an enabler in this solution.

The technologies involved in some embodiments of the present invention include speech recognition, machine translation, and communication control.

Speech recognition has been an area with slow development as it has shown to be quite difficult to produce speech recognition with low failure rate. A distributed Speech recognition solution has been developed within ETSI Aurora group that enhances the quality in a networked environment. Relevant standards may include: ETSI ES 201 108 Speech Processing, Transmission and Quality Aspects (STQ) (Distributed speech recognition, Front- and feature extraction algorithm, Compression algorithms); ETSI ES 202 050 Speech Processing, Transmission and Quality Aspects (STQ); (Distributed speech recognition, Advanced front-end feature extraction algorithm, Compression algorithms); ETSI ES 202 211 Speech Processing, Transmission and Quality Aspects (STQ) (Distributed speech recognition, Extended front- and feature extraction algorithm, Compression algorithms, Back-end speech reconstruction algorithm); ETSI ES 202 212 Speech Processing, Transmission and Quality Aspects (STQ)(Distributed speech recognition, Extended advanced front- and feature extraction algorithm, Compression algorithms, Back-end speech reconstruction algorithm); and RFC 3557 RTP Payload Format for European Telecommunications Standards Institute (ETSI) European Standard ES 201 108 Distributed Speech Recognition Encoding, the disclosures of which are incorporated by reference herein.

Machine language translation of text has become cost-effective in many areas. A vision is to enable translation of natural languages. The European Commission's Sixth Research Programme financed TC-STAR is such a project, where one of the goals is "Language translation of conversational speech".

Communication Control mechanisms are involved in all networked communication. Well-known standards, such as 3GPP and IETF, provide recommendations in these areas. Call control, session control and Intelligent Network control and IP Multimedia Subsystem (IMS) may be technologies on which embodiments of the present invention are based.

An example control mechanism according to some embodiments of the present invention is provided below. A purpose of this control mechanism is to provide improved conditions for real-time language translation in a network. The mechanism may include:

Controlling the network language translation server behavior by providing relevant commands and parameters based upon the calling party's preferred languages and modal to use as well as the calling party's sex and age.

Controlling the network Language Translation server behavior by providing relevant commands and parameters based upon the called party's preferred languages and modal to use as well as the called party's sex and age.

Controlling the DSR client behavior by providing relevant commands and parameters based upon the calling party's preferred languages and modal to use as well as the calling party's sex and age.

Controlling the DSR client behavior by providing relevant commands and parameters based upon the called party's preferred languages and modal to use as well as the called party's sex and age.

Controlling the Speech client behavior by providing relevant commands and parameters based upon the calling party's preferred languages and modal to use as well as the calling party's sex and age.

Controlling the Speech client behavior by providing relevant commands and parameters based upon the called party's preferred languages and modal to use as well as the called party's sex and age.

Controlling the Text client behavior by providing relevant commands and parameters based upon the calling party's preferred languages and modal to use as well as the calling party's sex and age.

Controlling the Text client behavior by providing relevant commands and parameters based upon the called party's preferred languages and modal to use as well as the called party's sex and age.

The X-LT Client control mechanism for DSR, Speech and Text clients are internal to the handset (Mobile Terminal). The semantics and syntax of this mechanism is described below with reference to interface "iA3".

The X-LT Client control mechanism for the Network Language Translation server is external to the handset. The semantics and syntax of that mechanism is described below with reference to interface "iA1" and "iA2". Different communication protocol standards can be used for this control mechanism. Examples include USSD in GSM and UMTS networks, Internet protocol (IP), and/or Session Initiation Protocol (SIP).

The semantics and syntax of the X-Language translation Server control mechanism is described below with reference to interface "iS1".

Examples of application control message syntax for a control mechanism according to some embodiments of the present invention are provided below.

---

X-LT Client Control "iA3"

---

(71A) DSR, Text, Speech client control (71Aa) Language and modal selection::= <'*'> <Select Language command> <'*'> <Language code>[<'*'> <modal code>]<'#'>
(71Ab) Language inquiry::= <'*'> <'Language Availability command><'#'>
(71Ac) Select Voice adaptation::= <'*'> <Voice Adaptation command><'*'> <sex> [<'*'> <age>]<'#'>
(71Ad) End session::=<'*'> <'END'>
(71B) DSR, Text, Speech client responses (71Ba) Language selection response::= <'*'> <Client Language selected><'*'> <Language code> [<'*'> < modal code>]<'#'>
(71Bb) Language inquiry response::= <'*'> <Client Language available> <'*'> ['Preferred'<'*'>]
<Language code> [<'*'> <modal code>] {<'*'> <Language code> [<'*'> <modal code>] <'#'>
(71Bc) Voice adaptation response::= <'*'> <Client Voice Adaptation> <'*'> <sex> [<'*'> <age>] <'#'>

| X-LT Client Control "iA1" |
|---|
| (72A) X-LT A-Client connection service request to server |
| A-Client service request::= <'*'> <Network LT-server identity> <'*'> <A-client-id> <'*'> <Language code>[<'*'> < modal code>] [<'*'> <'TUNE'><'*'><sex> [<'*'> <age>] <'*'> <'CONNECT'> <'*'> <B-client-id> <'*'> <Language code> [<'*'> < modal code>] {<'*'> <'CONNECT'> <'*'> <C-client-id> <'*'> <Language code> [<'*'> < modal code>]}<'#'> |
| (72B) X-LT Server Response to A-Client |
| X-LT server service request response::= <'*'> <A-client-id> <'*'> <X-LT Result code> <'*'> <Language code> [<'*'> < modal code>] <'#'> |
| (72C) X-LT A-Client ending session |
| A-Client requests end of session::= <'*'> <Network LT-server identity> <'*'> <A-client-id> <'*'> <'ENDSESSION'> |

| X-LT Client Control "iA2" |
|---|
| (73A) X-LT Server control Request to B-Client (and C-Client in multiparty connections) |
| X-LT server service request ::= <'*'> <'CALLER'> <'*'> <A-client-id> <'*'> <Language code>[<'*'> < modal code>] <'*'> <'CONNECT'> <'*'> <B-client-id> <'*'> <Language code> [<'*'> < modal code>] <'#'> |
| (73B) X-LT B-Client Response to Server |
| X-LT server service request response::= <'*'> <A-client-id> <'*'> <B-Client Result code> <'*'> <Language code> [<'*'> < modal code>] <'#'> |
| (73C) X-LT A-Client ending session |
| A-Client requests end of session::= <'*'> <B-client-id> <'*'> <'ENDSESSION'> |
| (73D) X-LT A-Client ending session |
| B-Client requests end of session::= <'*'> <Network LT-server identity> <'*'> <B-client-id> <'*'> <'ENDSESSION'> |

| X-Language translation Server control "iS1" |
|---|
| (74A) X-LT Server Control Request |
| X-LT server control request ::= <'*'> [<'ESTABLISH'> | <'ENDSESSION'> <'*'>] <'CALLER'> <'*'> <A-client-id> <'*'> <Language code>[<'*'> < modal code>] <'*'> <'CONNECT'> <'*'> <B-client-id> <'*'> <Language code> [<'*'> < modal code>] <'#'> |
| (74B) X-Language Translation Response to Service Control |
| X-LT server control response::= <'*'> [<'ESTABLISH'> | <'ENDSESSION'><'*'>] <'A'> <'*'> <LXT-Result Code> <'*'> <Language code> [<'*'> < modal code>]<'*'> <'B'> <'*'> <LXT-Result Code> <'*'> <Language code> [<'*'> < modal code>] <'#'> |

An example application control sequence for a control mechanism according to some embodiments of the present invention is provided below.
Initial Preparations in Each Handset
  1. Language inquiry (71Ab)
  2. Language inquiry response (71Bb)
Establishing a Session
  1. A-Client service request (72A)
  2. X-LT server control request (74A)
  3. X-LT server control response (74B)
  4. X-LT server service request (73A)
  5. Language and modal selection (71Aa) B-client
  6. Language selection response (71Ba) B-client
  7. X-LT server service request response (73B)
  8. X-LT server control request (74A)
  9. X-LT server control response (74B)
  10. X-LT service request response (72B)
  11. Language and modal selection (71Aa) A-client
  12. Language selection response (71Ba) A-client
Ending a Session
  1. End session (71Ad)
  2. A-Client requests end of session (72C)
  3. A-Client requests end of session (73C)
  4. X-LT server control request (74A)
  5. X-LT server control response (74B)

Examples of syntax elements and the accompanying description for a control mechanism according to some embodiments of the present invention are provided below.

| Syntax description Explanations of used Baccus-Naur-Form (BNF) Notations: | |
|---|---|
| <....> | syntax element |
| ::= | defined as |
| \| | Or-selection |

-continued

| Syntax description<br>Explanations of used Baccus-Naur-Form (BNF) Notations: |  |
|---|---|
| [...] | optional elements |
| {...} | optional elements that can be repeated |
| (...) | comments |
| '..' | the permitted value of the digit or character is shown within quotation marks |

Messages are coded in 7-bit alphabet [ref. ETS 300 628, GSM 03.38]

| Syntax elements |
|---|
| <Select Language command> ::= <'SelectLanguage'><br><Language Availability command>::= <'LanguageAvailability'><br><Voice Adaptation command>::= <'VoiceAdaptation'><br><Client Language selected>::= <'ClientSelectedLanguage'><br><Client Language available>::=<'ClientLanguagesList'><br><Client Voice Adaptation>:=<'ClientVoiceAdaption'><br><Network LT-server identity::= <SIP-adress> \| IP-address> \| <Network Service Number><br><Network Service Number>::= <number in the range of 0 to 255> (defined by the network/<br>service operator.<br>< X-LT Result code>::=<digit> (result codes 0 - 9, codes explained below)<br><Language code>::=< 'languagecode'> (Language code according to ISO 639-2, -464<br>language codes)<br><modal code>::= <'speech'>\| <'text'> \| < 'bothspeechandtext'><br><sex>::= <default>\|<'male'>\| <'female'> \| <default><br><age>::= <default>\|<below10>\|below20>\|<mid>\|<old><br><A-client-id>::= <international dialing number> \| <SIP- address> \| <IP-address><br><B-client-id>::= <international dialing number> \| <SIP- address> \| <IP-address><br><C-client-id>::= <international dialing number> \| <SIP- address> \| <IP-address> |

| X-LT Result Code |
|---|
| <attribute>::=<'0'><br><attribute-value>::= <result code> (0 - 9) (error cause explained below)<br>    0 Service enabled<br>    1 Service not available |

Many variations and modifications can be made to the preferred embodiments without substantially departing from the principles of the present invention. All such variations and modifications are intended to be included herein within the scope of the present invention, as set forth in the following claims.

That which is claimed:

1. A language translation device, comprising:
a network transceiver configured to provide communication between first and second communication terminals;
a language recognition unit configured to receive a signal representing speech in a first human language from the first communication terminal and map the signal to machine-readable intermediate data that is indicative of sounds in the first human language, wherein the signal representing speech in the first human language comprises features extracted according to a parametric model that is different than that used by the first communication terminal when operating in a non-language translation mode, and wherein the language recognition unit is configured to provide a request to the first communication terminal to use the parametric model to generate the signal representing speech in the first human language to provide automatic capability negotiation between the language translation device and the first communication terminal; and
a language translation unit configured to translate the machine-readable intermediate data indicative of sounds in the first human language to further machine-readable intermediate data indicative of sounds in a second human language, to generate a translated signal representing speech and/or text in a second human language, which is different from the first human language, in response to the further intermediate data and provide the translated signal to the second communication terminal, the speech and/or text represented by the translated signal having a meaning corresponding to that of the speech represented by the received signal.

2. The device of claim 1, wherein the network transceiver is configured to receive an indication of one of speech and text as a desired output at the second communication terminal, and wherein the language translation unit comprises:
a text output unit configured to generate the translated signal representing text in the second human language in response to the indication of text as the desired output; and
a speech synthesizing unit configured to generate the translated signal representing speech in the second human language in response to the indication of speech as the desired output.

3. The device of claim 2, wherein the network transceiver is configured to receive an indication of a sex and/or age of a user of the first communication terminal, and wherein the speech synthesizing unit is configured to generate the translated signal representing speech in the second human language in real time using a voice in accordance with the indication of the sex and/or the age of the user of the first communication terminal.

4. The device of claim 1, wherein:
the network transceiver is configured to receive, from the first communication terminal, an indication of the first human language among a plurality of available languages as a source language;
the language recognition unit is configured to map the received signal to the intermediate data responsive to the indication of the first human language as the source language;
the network transceiver is configured to receive, from the second communication terminal, an indication of the second human language among the plurality of available languages as a target language; and
the language translation unit is configured to generate the translated signal responsive to the indication of the second human language as the target language.

5. The device of claim 1, wherein the language recognition unit is configured to select the first human language among a plurality of available languages as a default source language for mapping the received signal according to a first geographic location associated with the first communication terminal, and wherein the language translation unit is configured to select the second human language among the plurality of available languages as a default target language for generating the translated signal according to a second geographic location associated with the second communication terminal.

6. The device of claim 5, further comprising:
a controller configured to determine the first and/or second geographic locations according to a respective country code, positioning signal, and/or geographic location of network infrastructure associated with the first and/or second communication terminals.

7. The device of claim 1, wherein the network transceiver is configured to receive a translation service request including an identification of the second communication terminal from the first communication terminal, transmit an invitation to the second communication terminal responsive to receiving the translation service request, receive an acceptance from the second communication terminal in response to the invitation, and establish the communication between the first and second communication terminals in response to receiving the acceptance.

8. The device of claim 1, wherein:
the network transceiver is configured to provide communication with a third communication terminal;
the language translation unit is configured to generate a second translated signal representing speech and/or text in a third human language, which is different from the first and second human languages, in response to the intermediate data and provide the translated signal to the third communication terminal, the speech and/or text represented by the second translated signal having a meaning corresponding to that of the speech represented by the received signal.

9. The device of claim 1, wherein the signal representing speech in the first human language is more error resilient than a vocoded signal with respect to radio transmission.

10. A method of providing language translation between first and second communication terminals, the method comprising:
establishing communication between the first and second communication terminals;
receiving a signal representing speech in a first human language from the first communication terminal, wherein the signal comprises features extracted according to a parametric model that is different than that used by the first communication terminal when operating in a non-language translation mode;
mapping the signal to machine-readable intermediate data indicative of sounds in the first human language in a language recognition unit;
translating the machine-readable intermediate data indicative of sounds in the first human language to further machine-readable intermediate data indicative of sounds in a second human language;
generating a translated signal representing speech and/or text in the second human language, which is different from the first human language, in response to the further intermediate data in a language translation unit, the speech and/or text represented by the translated signal having a meaning corresponding to that of the speech represented by the received signal; and
providing the translated signal to the second communication terminal,
the method further comprising:
providing a request to the first communication terminal to use the parametric model to generate the signal representing speech in the first human language,
wherein the signal representing speech in the first human language is received from the first communication terminal in response to the request to provide automatic capability negotiation between a language translation device and the first communication terminal.

11. The method of claim 10, further comprising:
receiving an indication of one of speech and text as a desired output at the second communication terminal,
wherein generating the translated signal in the language translation unit comprises generating the translated signal representing one of speech and text in the second human language responsive to the indication of the desired output.

12. The method of claim 11, wherein the indication of the desired output comprises speech, and further comprising:
receiving, from the first communication terminal, an indication of a sex and/or an age of a user thereof,
wherein generating the translated signal in the language translation unit comprises generating the translated signal representing speech in the second human language in real time using a voice in accordance with the indication of the sex and/or the age of the user of the first communication terminal.

13. The method of claim 10, further comprising:
receiving, from the first communication terminal, an indication of the first human language among a plurality of available languages as a source language,
wherein mapping the received signal comprises mapping the received signal to the intermediate data in the language recognition unit responsive to the indication of the first human language as the source language; and
receiving, from the second communication terminal, an indication of the second human language among the plurality of available languages as a target language,
wherein generating the translated signal comprises generating the translated signal in the language translation unit responsive to the indication of the second human language as the target language.

14. The method of claim 10, further comprising:
selecting the first human language among a plurality of available languages as a default source language for mapping the received signal to the intermediate data in the language recognition unit according to a first geographic location associated with the first communication terminal; and
selecting the second human language among the plurality of available languages as a default target language for generating the translated signal in the language translation unit according to a second geographic location associated with the second communication terminal.

15. The method of claim 14, further comprising:
determining the first and/or second geographic locations according to a respective country code, positioning signal, and/or geographic location of network infrastructure associated with the first and/or second communication terminals.

16. The method of claim 10, wherein establishing the communication between the first and second communication terminals comprises:

receiving, from the first communication terminal, a translation service request including an identification of the second communication terminal;

transmitting an invitation to the second communication terminal responsive to the translation service request;

receiving, from the second communication terminal, an acceptance in response to the invitation; and establishing the communication between the first and second communication terminals in response to the acceptance.

17. The method of claim 10, wherein the signal representing speech in the first human language is more error resilient than a vocoded signal with respect to radio transmission.

18. A computer program product for providing language translation between first and second communication terminals, the computer program product comprising a non-transitory computer readable storage medium having computer readable program code embodied therein that, when executed by a processor, causes the processor to:

establish communication between the first and second communication terminals;

map a signal received from the first communication terminal to machine-readable intermediate data indicative of sounds in a first human language, wherein the signal represents speech in the first human language and comprises features extracted according to a parametric model that is different than that used by the first communication terminal when operating in a non-language translation mode;

translate the machine-readable intermediate data indicative of sounds in the first human language to further machine-readable intermediate data indicative of sounds in a second human language;

generate a translated signal representing speech and/or text in the second human language, which is different from the first human language, in response to the further intermediate data, the speech and/or text represented by the translated signal having a meaning corresponding to that of the speech represented by the received signal; and provide the translated signal to the second communication terminal, wherein, when executed by the processor, the computer readable program code further causes the processor to:

provide a request to the first communication terminal to use the parametric model to generate resenting speech in the first human language, wherein the signal representing speech in the first human language is received from the first communication terminal in response to the request to provide automatic capability negotiation between a language translation device and the first communication terminal.

19. The computer program product of claim 18, wherein the signal representing speech in the first human language is more error resilient than a vocoded signal with respect to radio transmission.

20. A mobile communication terminal, comprising:

a microphone configured to receive speech from a user in a first human language;

a controller configured to operate in a language translation mode and a non-language translation mode, wherein, when operating in the language translation mode, the controller is configured to extract features contained in the speech according to a parametric model that is different from that used by the mobile communication terminal when operating in the non-language translation mode to generate a signal representing the speech in the first human language and comprising the extracted features; and a transmitter configured to provide the signal representing the speech in the first human language to an external language translation server that is configured to provide communication between the mobile communication terminal and at least one other communication terminal;

wherein the controller is configured to receive a request to use the parametric model from the external language translation server and is configured to generate the signal representing speech in the first human language responsive to the request to provide automatic capability negotiation between the external language translation server and the mobile communication terminal.

21. The mobile communication terminal of claim 20, wherein the signal representing speech in the first human language is more error resilient than a vocoded signal with respect to radio transmission.

* * * * *

UNITED STATES PATENT AND TRADEMARK OFFICE
CERTIFICATE OF CORRECTION

PATENT NO.      : 8,868,430 B2                    Page 1 of 1
APPLICATION NO. : 12/355226
DATED           : October 21, 2014
INVENTOR(S)     : Burvall et al.

It is certified that error appears in the above-identified patent and that said Letters Patent is hereby corrected as shown below:

Title Page: Item (73) Assignees: Please correct "Ab, Lund (SE)"
to read -- AB, Lund (SE) --

In the Claims:

Column 24, Claim 18, Line 2:
Please correct "generate resenting speech"
to read -- generate the signal representing speech --

Signed and Sealed this
Twenty-fourth Day of February, 2015

Michelle K. Lee
*Deputy Director of the United States Patent and Trademark Office*